US012280911B2

(12) United States Patent
Song

(10) Patent No.: US 12,280,911 B2
(45) Date of Patent: Apr. 22, 2025

(54) FOLDABLE FILE BOX

(71) Applicant: All Star Houseware Ltd., Shanghai (CN)

(72) Inventor: Xiaowei Song, Shanghai (CN)

(73) Assignee: ALL STAR HOUSEWARE LTD., Shanghai (CN)

( * ) Notice: Subject to any disclaimer, the term of this patent is extended or adjusted under 35 U.S.C. 154(b) by 118 days.

(21) Appl. No.: 18/243,624

(22) Filed: Sep. 7, 2023

(65) Prior Publication Data

US 2024/0383640 A1 Nov. 21, 2024

(30) Foreign Application Priority Data

May 18, 2023 (CN) ......................... 202321216520.7

(51) Int. Cl.

| | |
|---|---|
| ***B65D 6/24*** | (2006.01) |
| ***B42F 15/00*** | (2006.01) |
| ***B65D 5/32*** | (2006.01) |
| *B65D 43/02* | (2006.01) |

(52) U.S. Cl.

CPC ...... *B65D 11/1893* (2013.01); *B42F 15/0094* (2013.01); *B65D 5/323* (2013.01); *B65D 43/0222* (2013.01)

(58) Field of Classification Search

CPC .. B65D 11/1893; B65D 5/323; B42F 15/0094

See application file for complete search history.

(56) References Cited

U.S. PATENT DOCUMENTS

| | | | | |
|---|---|---|---|---|
| 2,544,283 A * | 3/1951 | Snyder | B65D 5/26 | 229/199 |
| 4,330,050 A * | 5/1982 | Sangster | A45C 13/02 | 292/259 R |
| 5,429,261 A * | 7/1995 | Machino | B65D 11/184 | 220/675 |
| 6,619,540 B1 * | 9/2003 | Bazany | B65D 5/46008 | 229/199 |
| 7,044,326 B2 * | 5/2006 | Martin | B65D 7/06 | 220/676 |
| 2002/0092787 A1 * | 7/2002 | Cheng | B65D 11/1893 | 206/278 |

* cited by examiner

*Primary Examiner* — Mollie Impink

(74) *Attorney, Agent, or Firm* — MATTHIAS SCHOLL P.C.; Matthias Scholl

(57) ABSTRACT

A foldable file box includes: a plastic sheet including a bottom wall and two side walls that are foldable relative to the bottom wall to form a U-shaped structure; two side frames interlocking with the bottom wall and the two side walls to form a box structure including a top opening; two hanging rods each including a bottom portion interlocking with the top part of the plastic sheet, and two ends of each hanging rod respectively interlocking with the two side frames; and a top cover interlocking with the two side frames and the two hanging rods to close the top opening.

12 Claims, 15 Drawing Sheets

FOLDABLE FILE BOX

CROSS-REFERENCE TO RELATED APPLICATIONS

Pursuant to 35 U.S.C. § 119 and the Paris Convention Treaty, this application claims foreign priority to Chinese Patent Application No. 202321216520.7 filed May 18, 2023, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of storage boxes, and more specifically, to a foldable file box.

File boxes are a form of file storage products that offer advantages such as lightweight design, convenient storage, ample space, and easy access. However, conventional file boxes available in the market are mostly rigid cardboard boxes or injection-molded plastic parts that are non-foldable, which incur higher costs and damage during packaging and transportation. Moreover, most of these boxes can only accommodate a specific size of file folders, limiting their versatility.

SUMMARY

The disclosure provides a foldable file box comprising:

- a plastic sheet, comprising a bottom wall and two side walls, and the two side walls being foldable relative to the bottom wall to form a U-shaped structure;
- two side frames, interlocking with the bottom wall and the two side walls to form a box structure comprising a top opening;
- two hanging rods, each comprising a bottom portion interlocking with the top part of the plastic sheet, and two ends of each hanging rod respectively interlocking with the two side frames; and
- a top cover, interlocking with the two side frames and the two hanging rods to close the top opening.

In a class of this embodiment, the two side walls and the bottom wall each comprises a plurality of clasps that are foldable; the two side frames and the two hanging rods each comprises a plurality of first grooves for respectively interlocking with corresponding clasps.

In a class of this embodiment, each of the two side frames comprises an inner wall comprising a U-shaped groove; and the two side walls and the bottom wall are embedded into the U-shaped groove.

In a class of this embodiment, the plurality of clasps are trapezoidal structures disposed on the top portion of each of the two side walls and both ends of the bottom wall; the trapezoidal structures on the two side walls are foldable and interlock with the two hanging rods; and the trapezoidal structures on the bottom wall are foldable and interlock with the two side frames.

In a class of this embodiment, the trapezoidal structures are bent to an angle of approximately 45° relative to the two side walls or the bottom wall.

In a class of this embodiment, both ends of each of the two hanging rods comprise a U-shaped fastener comprising two outward extending walls; and each of the two side frames comprises a second groove matched with the U-shaped fastener.

In a class of this embodiment, the plastic sheet, the two side frames, the two hanging rods, and the top cover comprise a flexible material, such as plastic; the two side frames, the two hanging rods, and the top cover are separately manufactured through an injection-molded process.

In a class of this embodiment, the two hanging rods and the two side frames each comprises a protruding edge through which a folder is hooked on the box structure.

In a class of this embodiment, each of the two side frames comprises a bottom part and a plurality of wheels pivotally connected to the bottom part.

In a class of this embodiment, each of the two side frames comprises a plurality of holes; each of the plurality of wheels comprises a bracket that is rotatable; one end of the bracket is disposed into a corresponding hole of each of the two side frames, and the plurality of wheels are detachably connected to the two side frames.

The following advantages are associated with the foldable file box of the disclosure.

The foldable file box comprises two hanging rods, a box body, and two side frames. The box body comprises plastic sheets. The two side frames comprise plastic. The two hanging rods, the box body, and the two plastic side frames interlock with each other, forming a closed storage box. The foldable file box is flat-packed, reducing production and transportation costs, while also preventing transportation damage. Additionally, the foldable file box features preset length and width dimensions to accommodate folders of various sizes in both length and width orientations.

Figure 1:
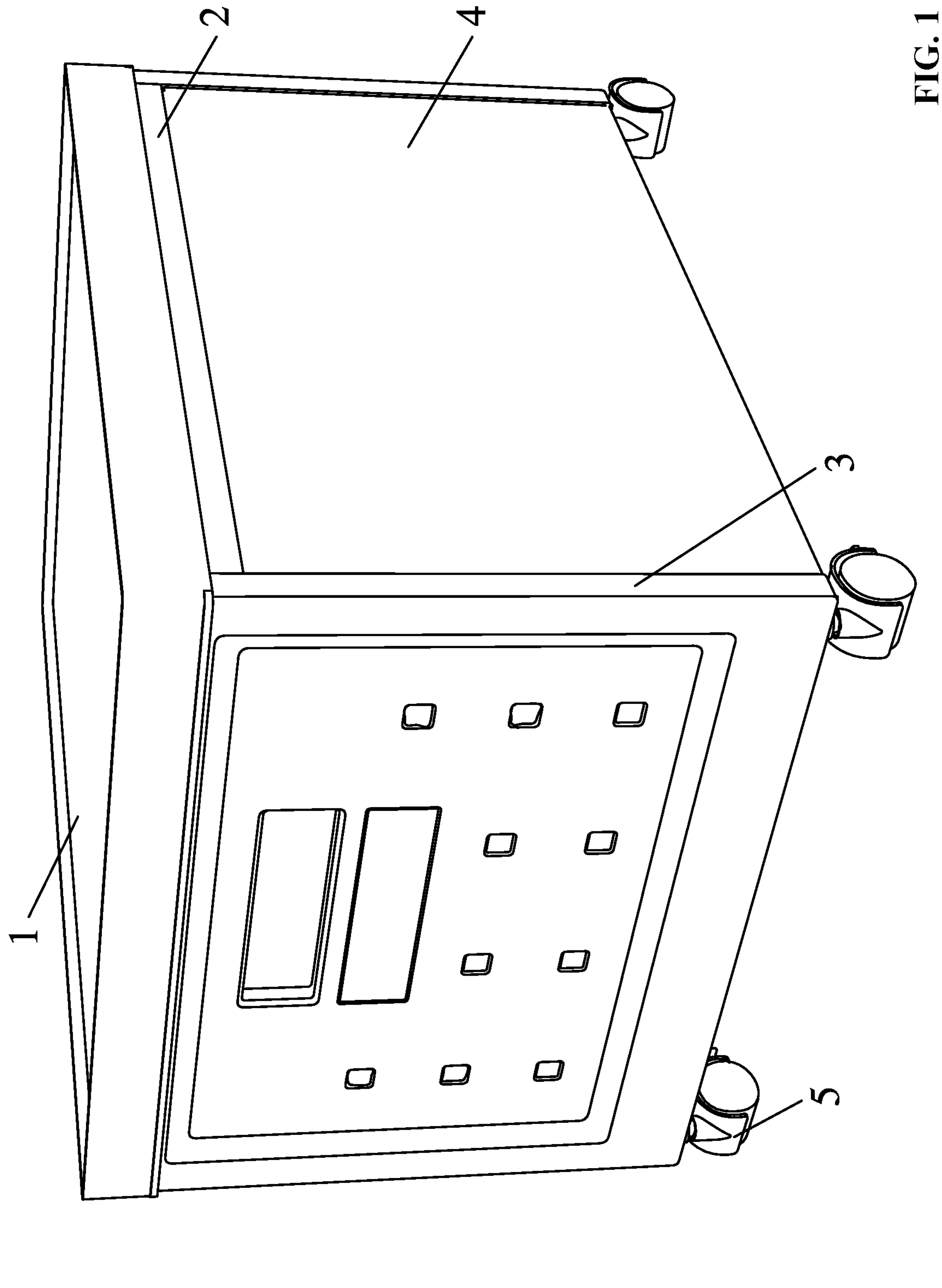
FIG. 1 is a perspective view of a foldable file box according to one embodiment of the disclosure.

In the drawings, the following reference numbers are used: 1. top cover; 2. Hanging rod; 20. U-shaped fastener; 21. Outward extending wall; 22. Protruding edge; 3. Side frame; 30. Second groove; 4. Plastic sheet; 40. Side wall; 41. Bottom wall; 42. Clasp; 5. Wheel; 50. Bracket; 6. First groove; 7. Hole; 8. Folder; and 9. Hook.

DETAILED DESCRIPTION

To further illustrate the disclosure, embodiments detailing a foldable file box are described below. It should be noted that the following embodiments are intended to describe and not to limit the disclosure.

As shown in FIGS. 1-15, the disclosure provides a foldable file box that adopts a flat packaging form for easy assembly, disassembly, transportation and use. The foldable file box can accommodate folders of various sizes in two different orientations. Unlike conventional file boxes in the market, which are mostly non-foldable injection-molded plastic parts or cardboard boxes, the foldable file box of the disclosure comprises a box body made of plastic sheets. The foldable file box reduces production costs and eliminates the issues of damage during packaging and transportation. Additionally, the conventional file boxes can only accommodate one size of folders, whereas the foldable file box of the disclosure is versatile in storing folders of different sizes.

The foldable file box comprises two hanging rods 2, a box body, and two side frames 3. The box body comprises plastic sheets 4. The two side frames 3 comprise plastic. The two hanging rods 2, the box body, and the two plastic side frames 3 interlock with each other, forming a closed storage box. The production and transportation costs and the damage during transportation of the foldable file box are all reduced compared with conventional foldable file boxes. Additionally, the storage box features preset length and width dimensions to accommodate folders of various sizes in both length and width orientations.

Typically, the folders are hung on both sides of the box body. Conventional file boxes on the market are usually integrally formed, leading to increased costs and a higher risk of damage during packaging and transportation.

Figure 14:
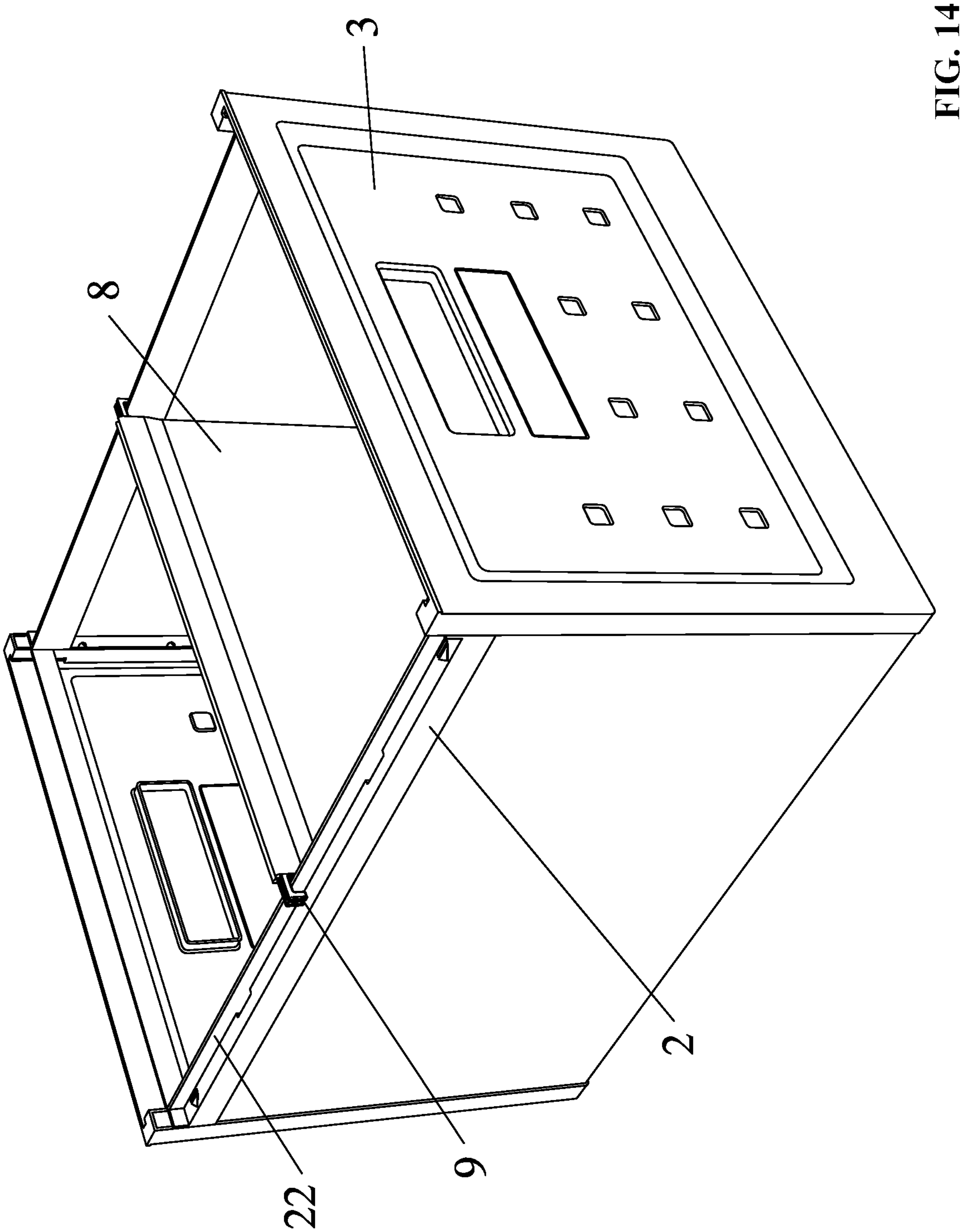
FIG. 14 is a schematic diagram illustrating the hanging of a folder on protruding edges of two hanging rods according to one embodiment of the disclosure.
Figure 15:
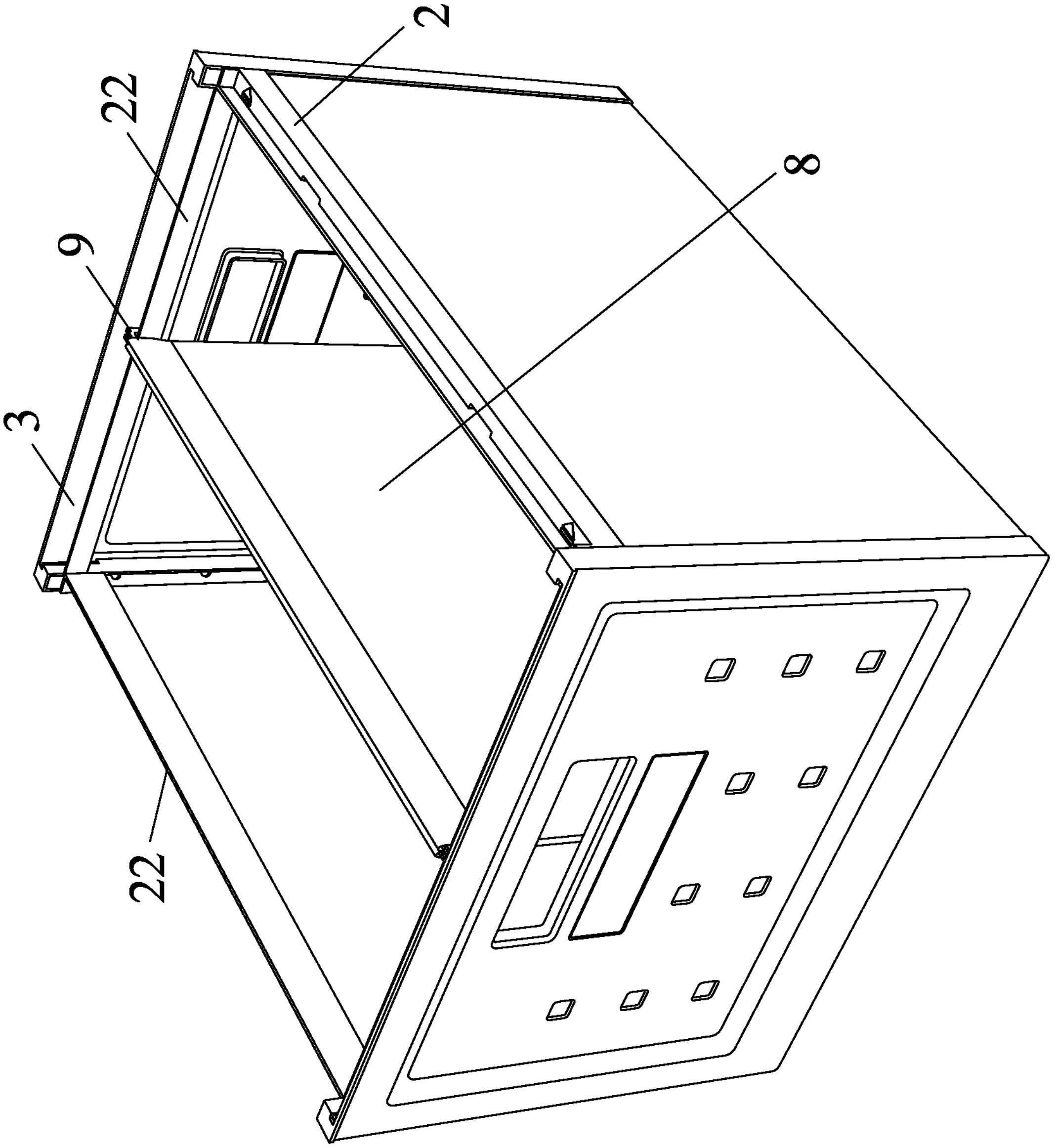
FIG. 15 is a schematic diagram illustrating the hanging of a folder on protruding edges of two side frames according to one embodiment of the disclosure.

As shown in FIG. 14, the two hanging rods 2 and the two side frames 3 both comprise a protruding edge 22. The box body comprises a top opening and a folder 8 is arranged inside the box body. The folder 8 comprises two hooks 9 respectively disposed on both ends. The two hooks 9 allow the folder 8 to be hung on the corresponding two protruding edges 22. Understandably, the folder 8 is illustrated as being arranged along the width direction in FIG. 14, utilizing the protruding edge 22 of each side frame 3. Optionally, in FIG. 15, the folder 8 is arranged along the length direction. This configuration allows for the storage of folders 8 with varying sizes in both the width and length directions.

The two hanging rods 2, the box body, and the two side frames 3 are all flat structures that interlock with each other, forming a storage box. The design allows the entire product easy to package and transport.

Figure 2:
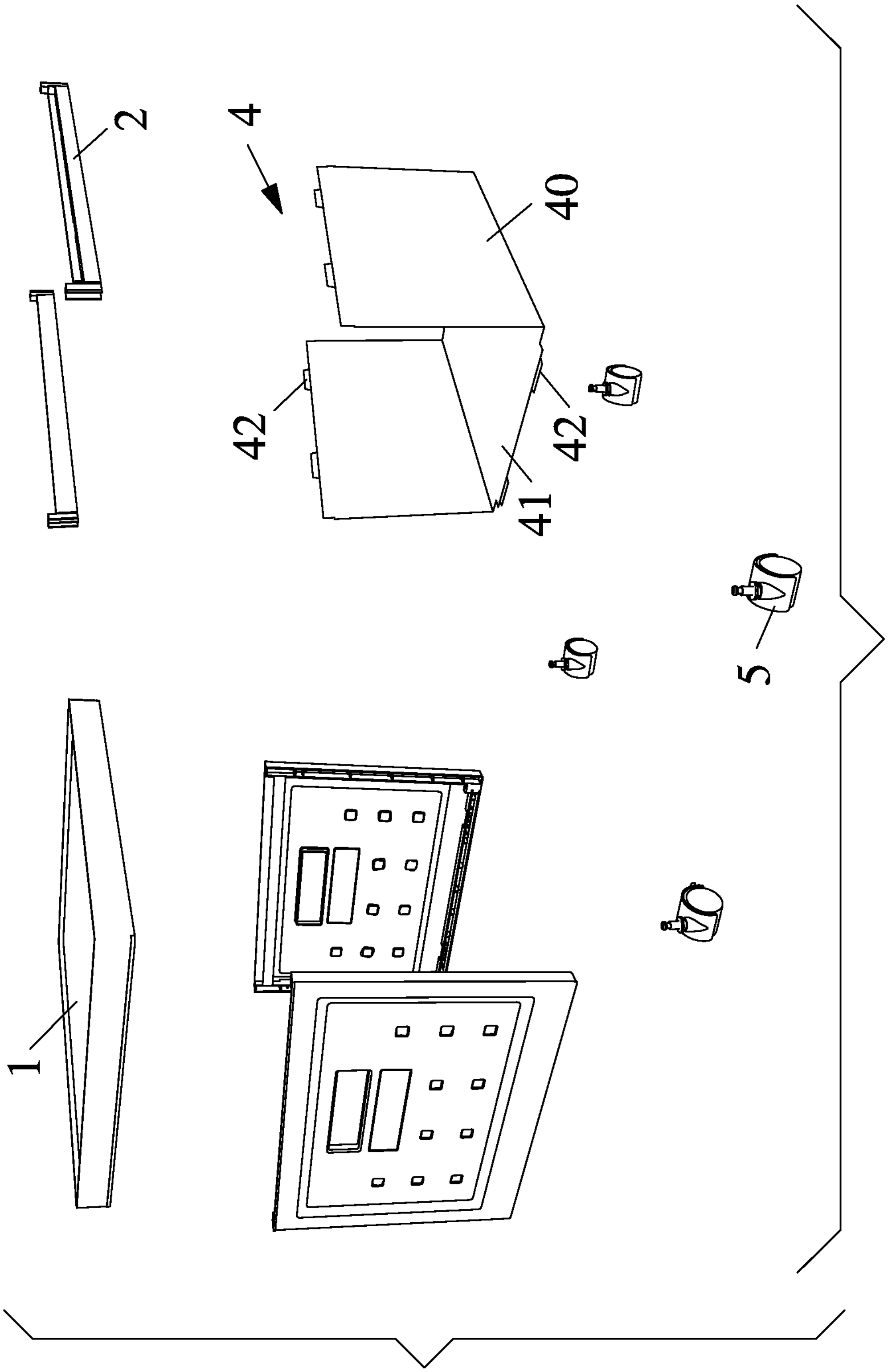
FIG. 2 is an exploded view of a foldable file box according to one embodiment of the disclosure.

As shown in FIGS. 1 to 2, the foldable file box further comprises a top cover 1 and a plurality of wheels 5.

As shown in FIGS. 3 to 9, the plastic sheets 4 are flattened by folding along creases. The plastic sheets 4 comprise a bottom wall 41 and two side walls 40. The two side walls are connected to both ends of the bottom wall. The plastic sheets further comprise a plurality of trapezoidal structures that are foldable and disposed both sides of the bottom wall and one end of each side wall. The trapezoidal structures on one end of each side wall are folded and interlock with the two hanging rods 2. The trapezoidal structures on both sides of the bottom wall are folded and interlock with the two side frames 3.

The two side frames 3 interlock with the two hanging rods 2, forming an open box structure that facilitates the storage of folders of various sizes in two directions. The top cover 1 is then used to close the open box structure, allowing for stable stacking of the foldable file box both vertically and horizontally.

Figure 12:
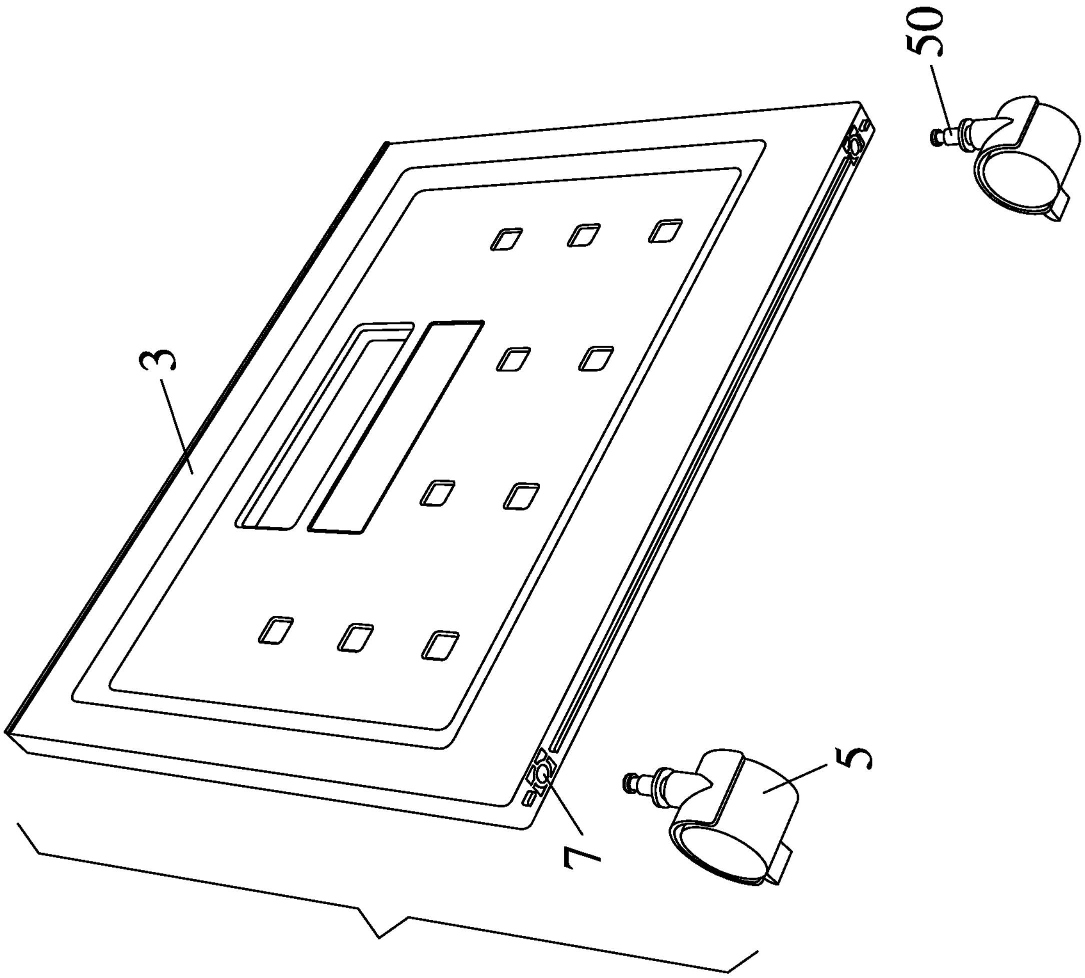
FIG. 12 is a schematic diagram of two wheels and a side frame in an uncombined state according to one embodiment of the disclosure.
Figure 13:
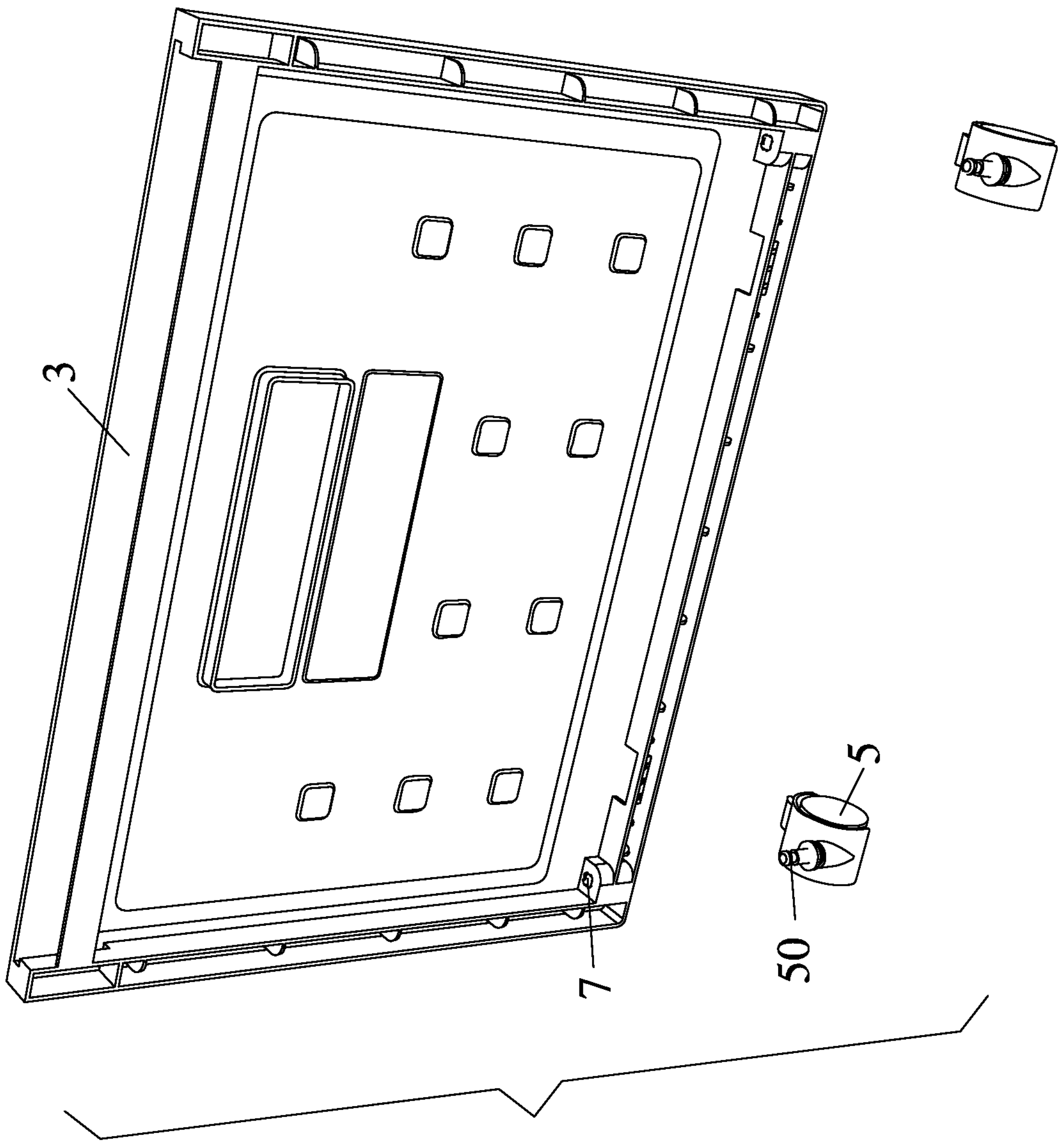
FIG. 13 is another schematic diagram of two wheels and a side frame in an uncombined state according to one embodiment of the disclosure.

As shown in FIGS. 12 to 13, each of the two side frame 3 comprises a bottom end, and a plurality of holes 7 are disposed at each corner of the bottom end. The plurality of wheels 5 is disposed within the corresponding holes 7 at the corners of the two side frames 3, facilitating easy movement of the file box. The main body of the file box comprises single-piece thin plastic sheets, reducing production and transportation costs.

Figure 3:
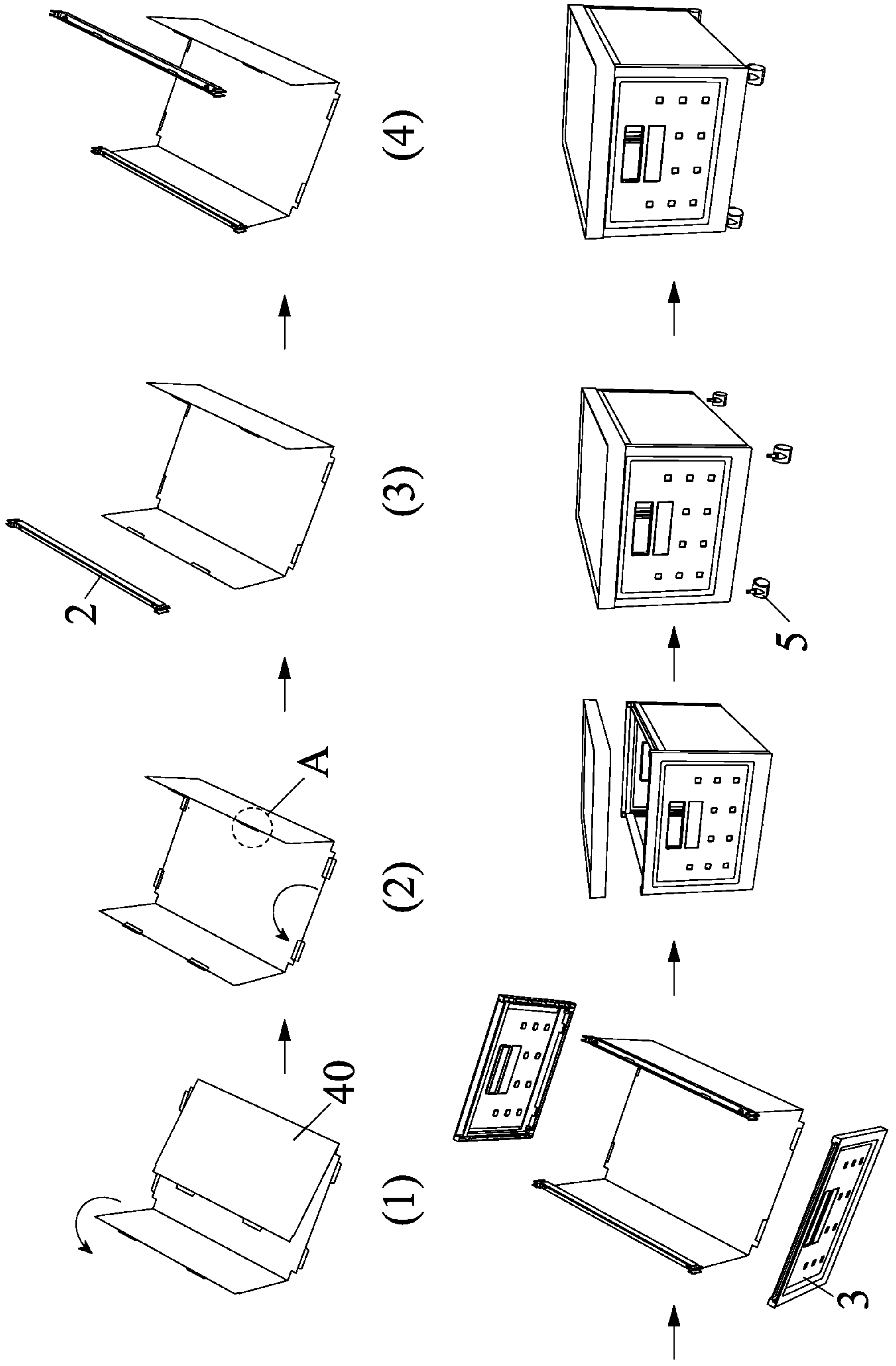
FIG. 3 is a schematic diagram illustrating the assembly steps of a foldable file box of the disclosure.

The trapezoidal structures serve as clasps 42 that are disposed on the top portion of each side walls and the both sides of the bottom wall 41. The two side frames 3 and the two hanging rods 2 each comprises a plurality of first grooves 6 for respectively interlocking with corresponding clasps. A foldable file box is formed through the pictures (1) to (8) as shown in FIG. 3. In pictures (1) to (2), the curved arrows indicate the direction in which the trapezoidal structures, also known as clasps, are bent to interlock with the two hanging rods 2 and the two side frames 3. Additionally, the bottom end of each side frame further comprises a plurality of protrusions in which the corresponding holes 7 are disposed. The plurality of holes 7 is used to receive the corresponding wheels 5.

Figure 4:
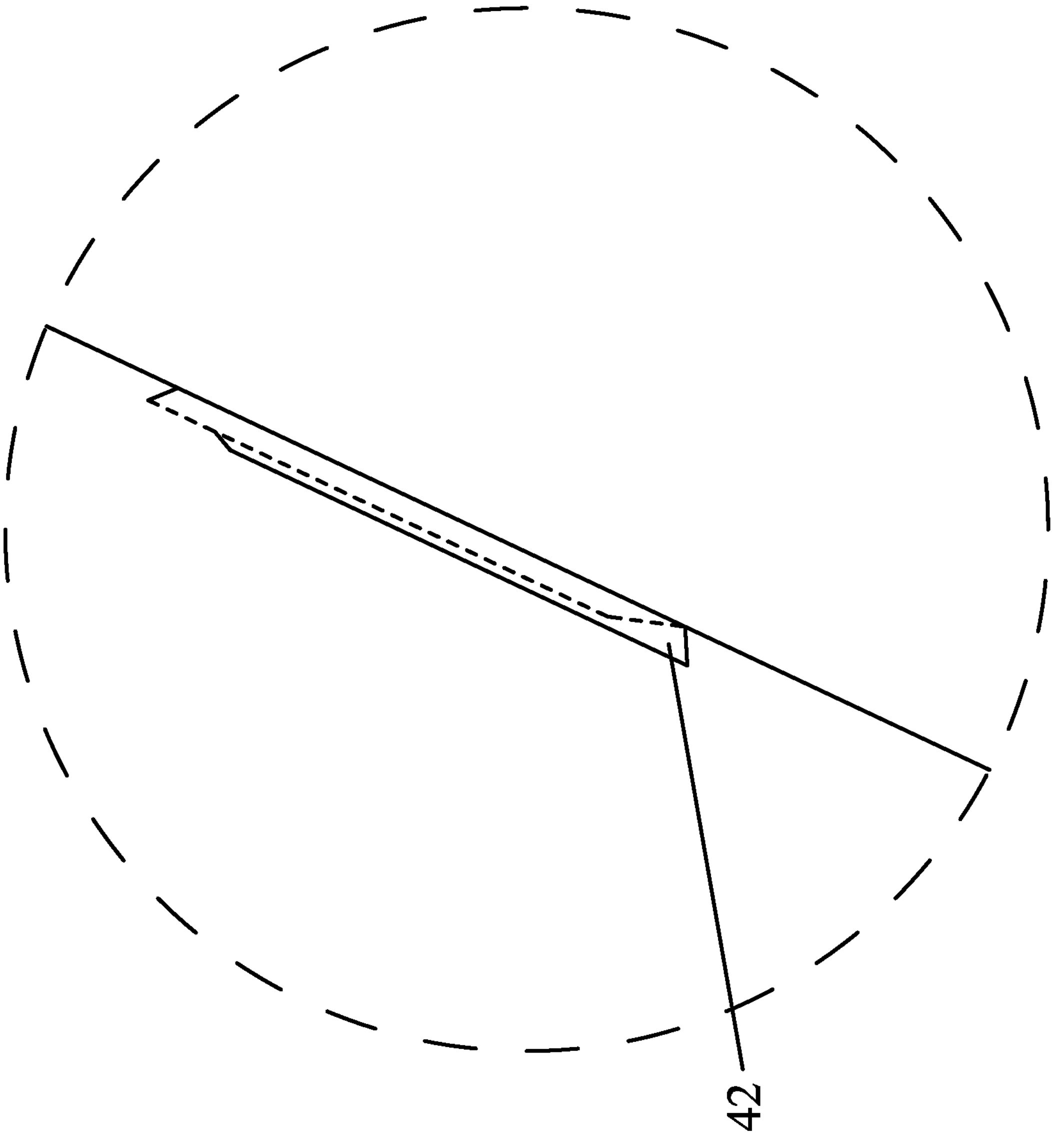
FIG. 4 is a local enlarge view of part A in FIG. 3.
Figure 5:
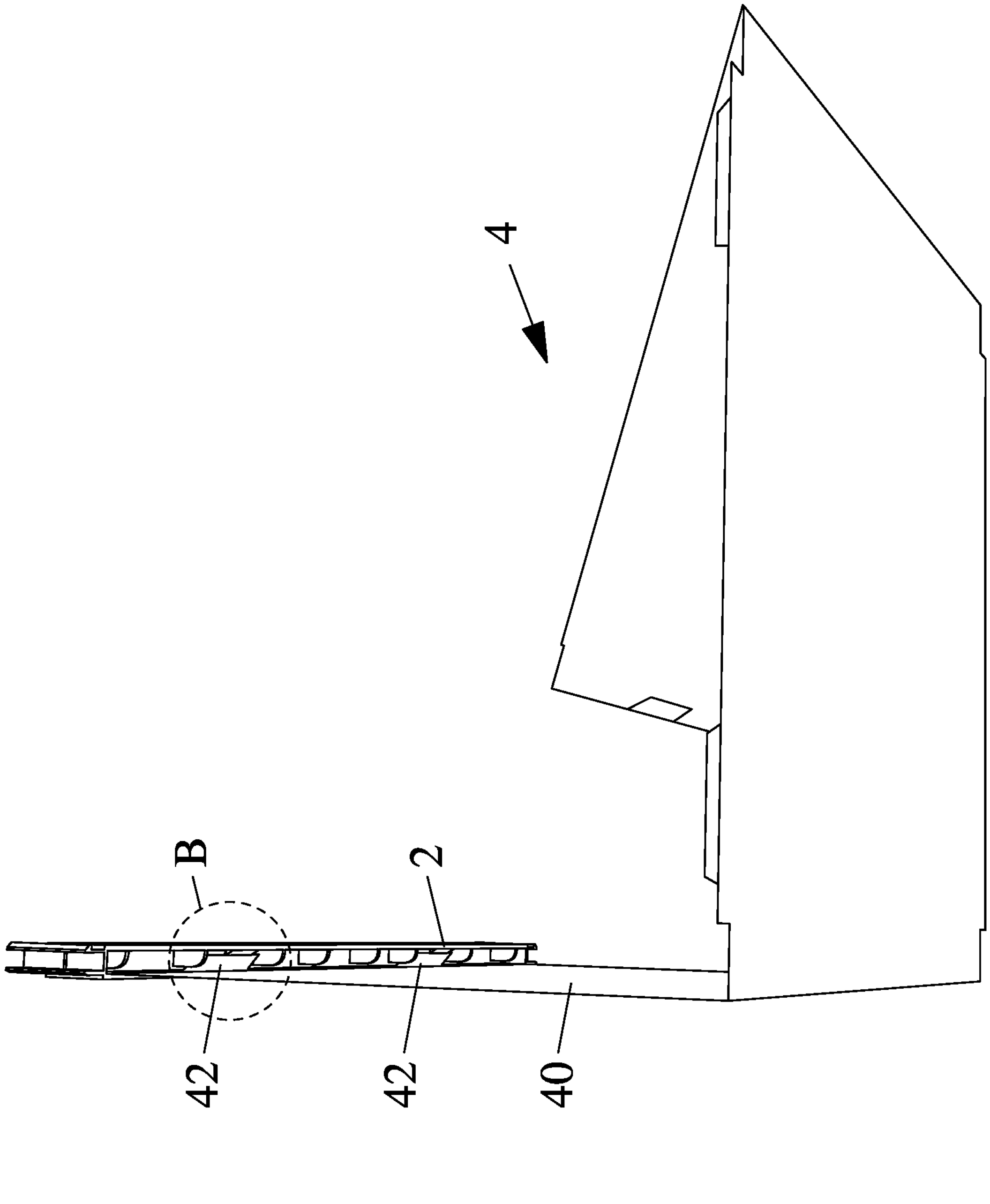
FIG. 5 is a schematic diagram of the installation of a hanging rod and a side wall according to one embodiment of the disclosure.
Figure 6:
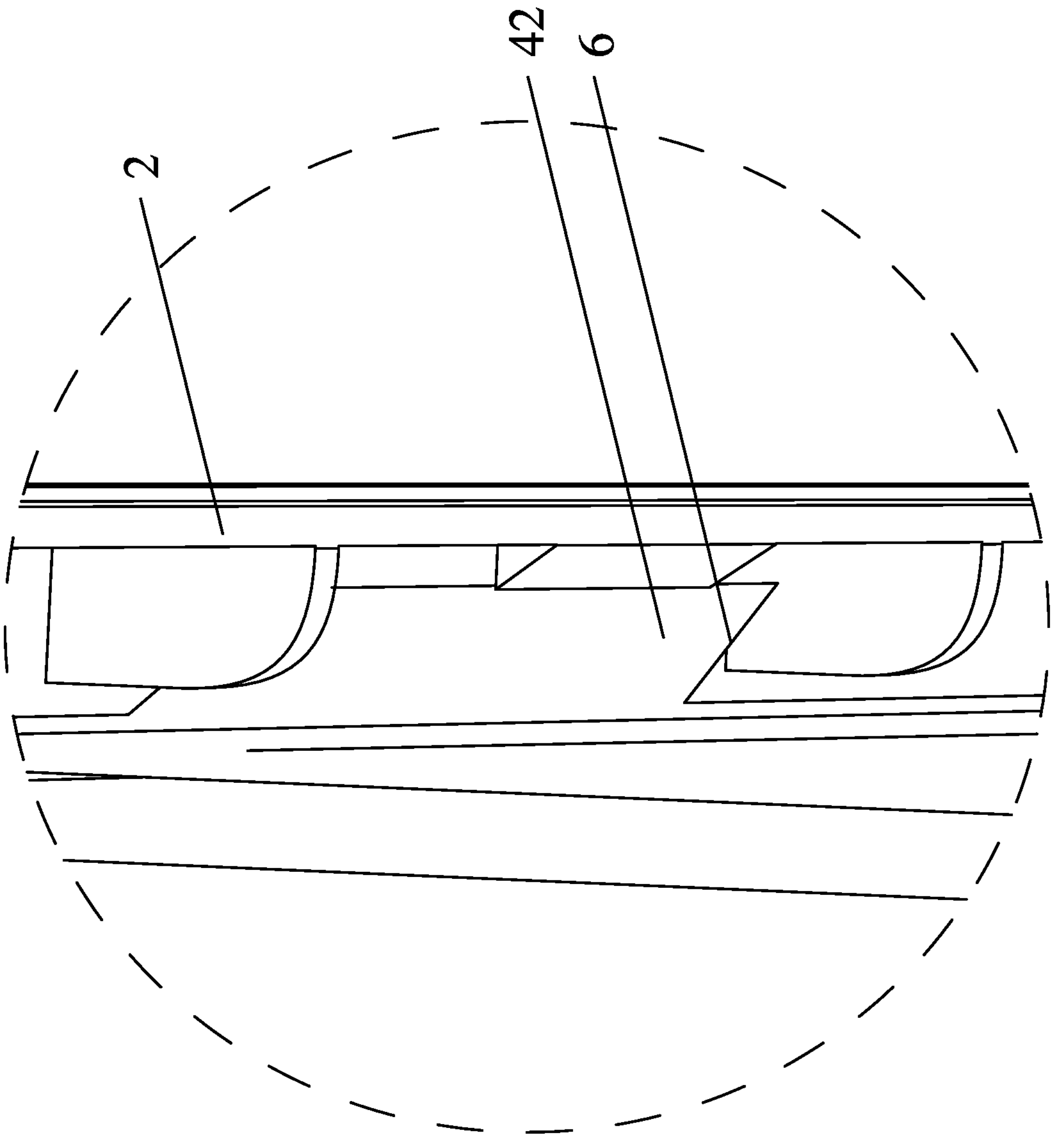
FIG. 6 is a local enlarge view of part B in FIG. 5.
Figure 7:
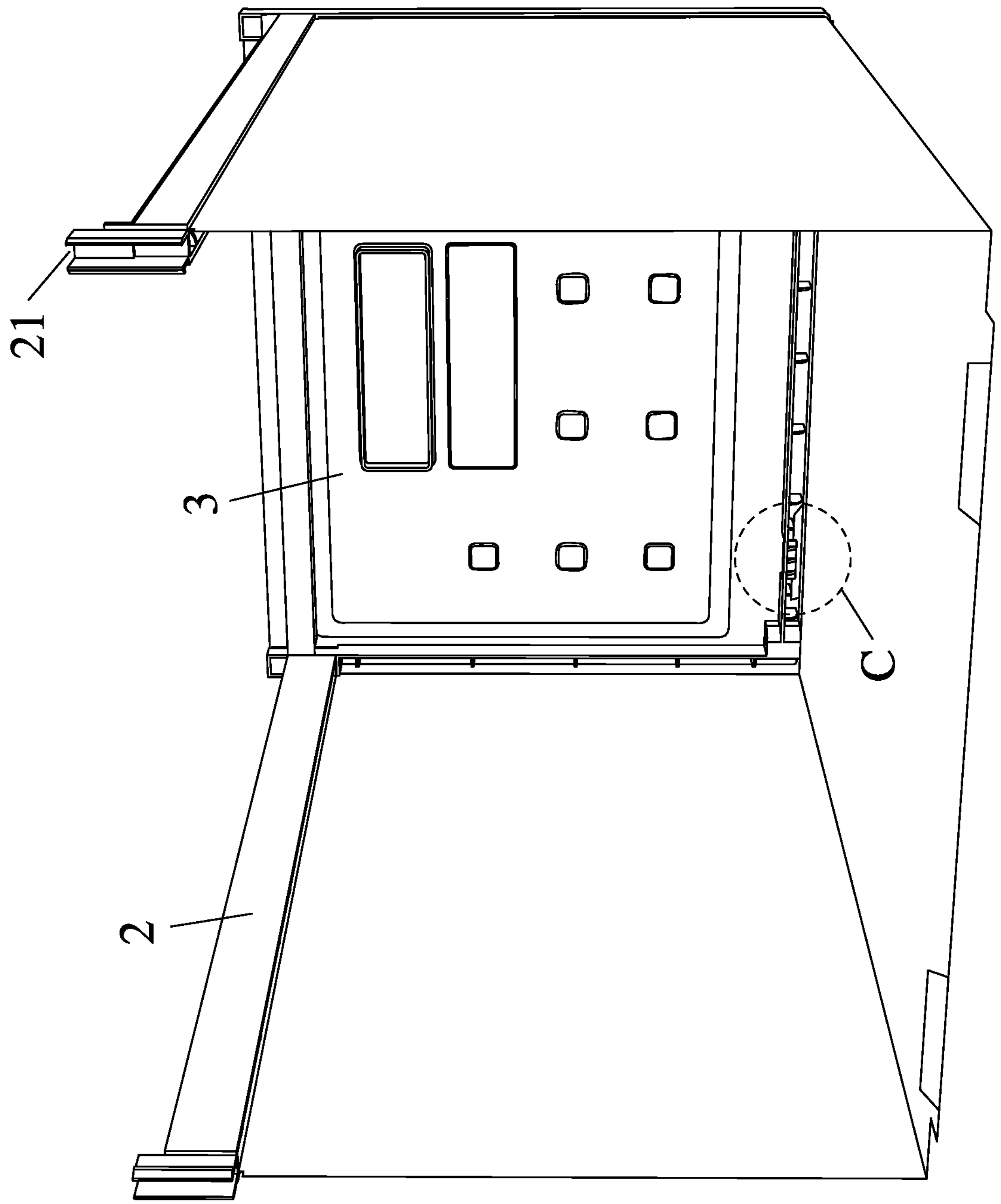
FIG. 7 is a schematic diagram of the installation of two hanging rods and a side frame according to one embodiment of the disclosure.

As shown in FIG. 4, the clasps 42 are arranged along the dashed line and are bent to serve as the trapezoidal structures. The two hanging rods 2 and the two side frames 3 separately comprise a plurality of first inverted structure each comprising a groove. The clasps are bent and fixedly disposed within the grooves to ensure a secure connection with the hanging rods 2 and the side frames 3.

Figure 8:
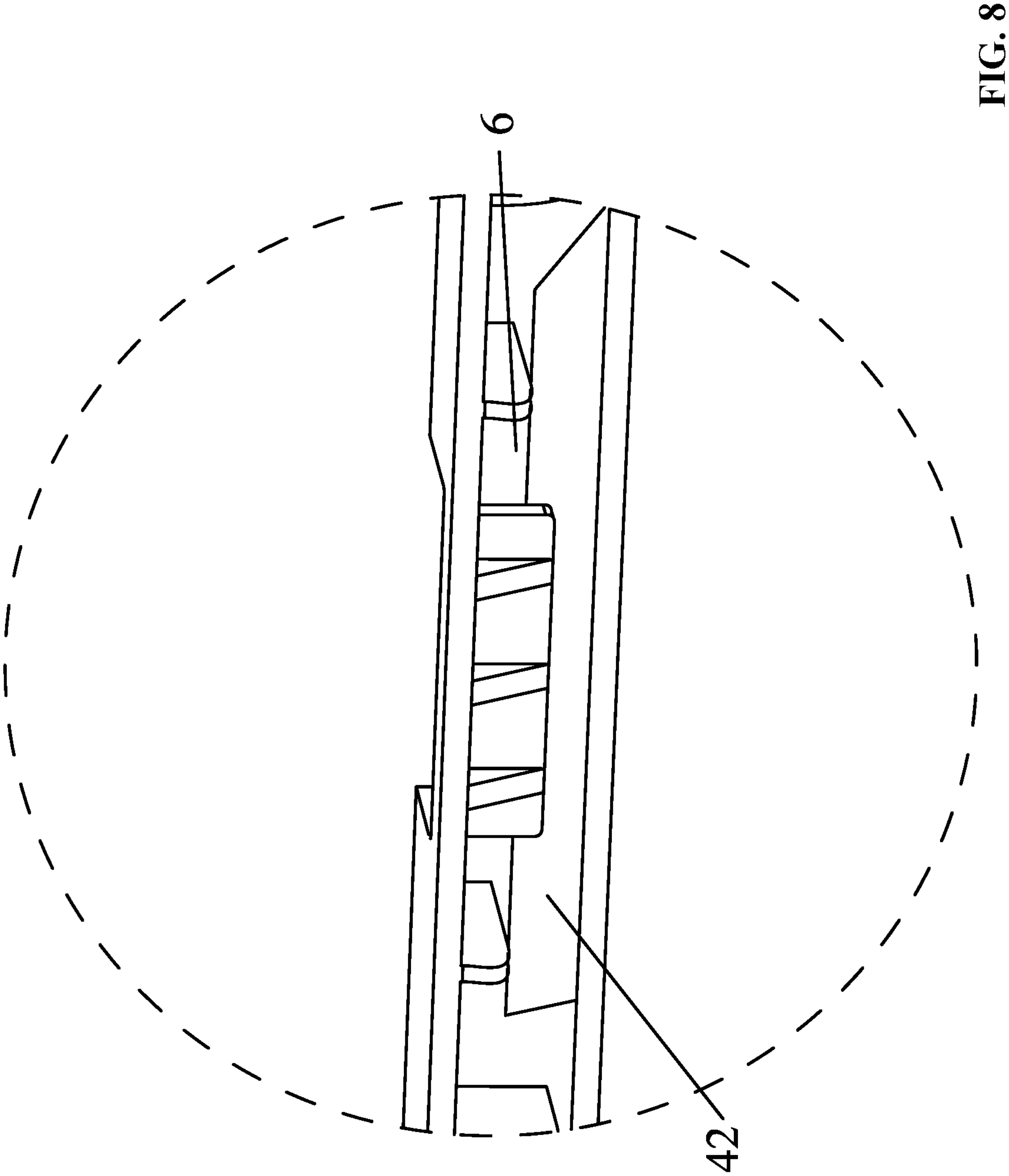
FIG. 8 is a local enlarge view of part C in FIG. 7.

The trapezoidal structures take an approximate angle of 45° relative to the corresponding wall, as illustrated in FIG. 8, facilitating the interlocking process with the hanging rods 2 and the side frames 3.

Figure 9:
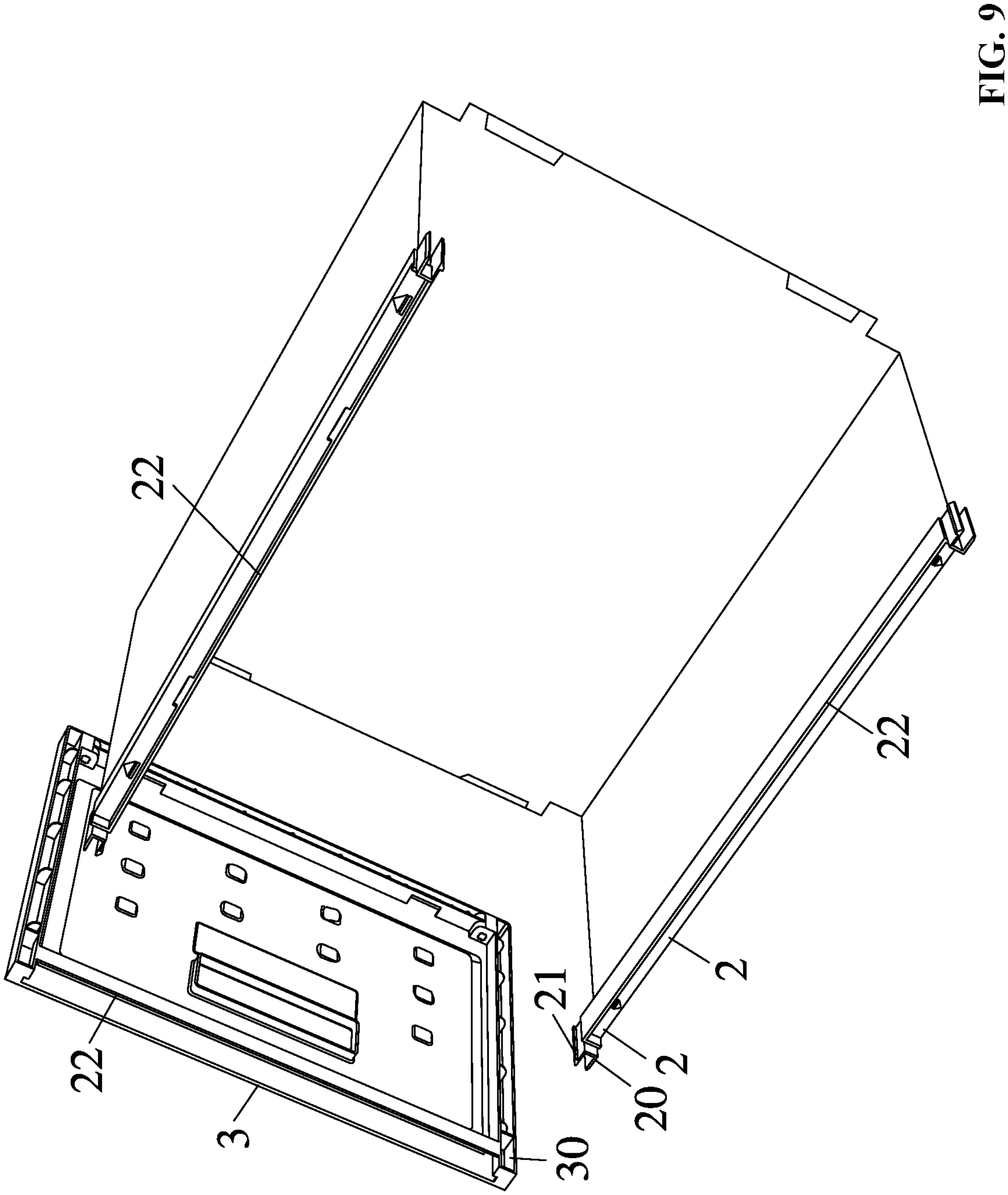
FIG. 9 is a schematic diagram of two hanging rods and a side frame in an uncombined state according to one embodiment of the disclosure.
Figure 10:
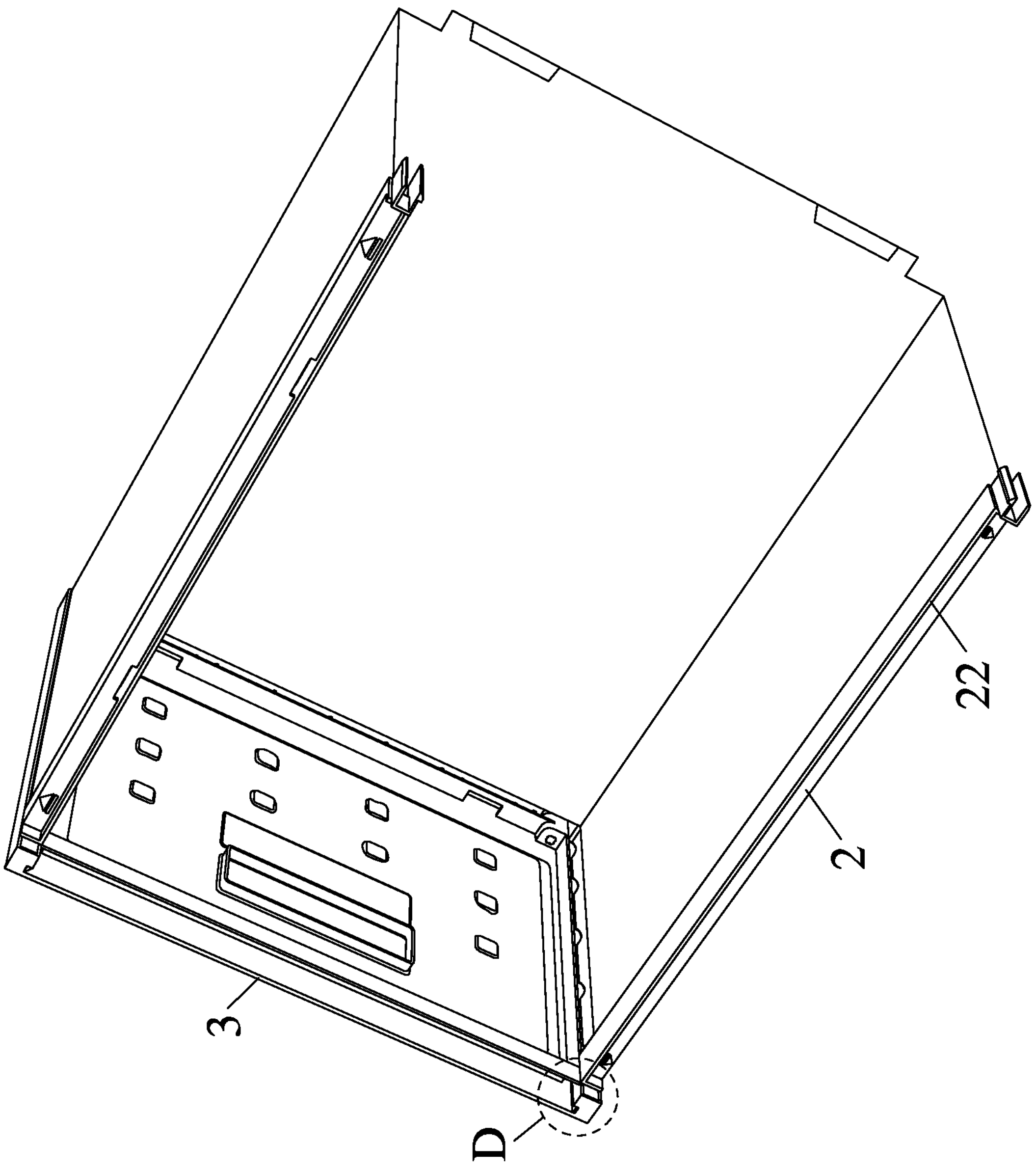
FIG. 10 is another schematic diagram of the installation of two hanging rods and a side frame according to one embodiment of the disclosure.
Figure 11:
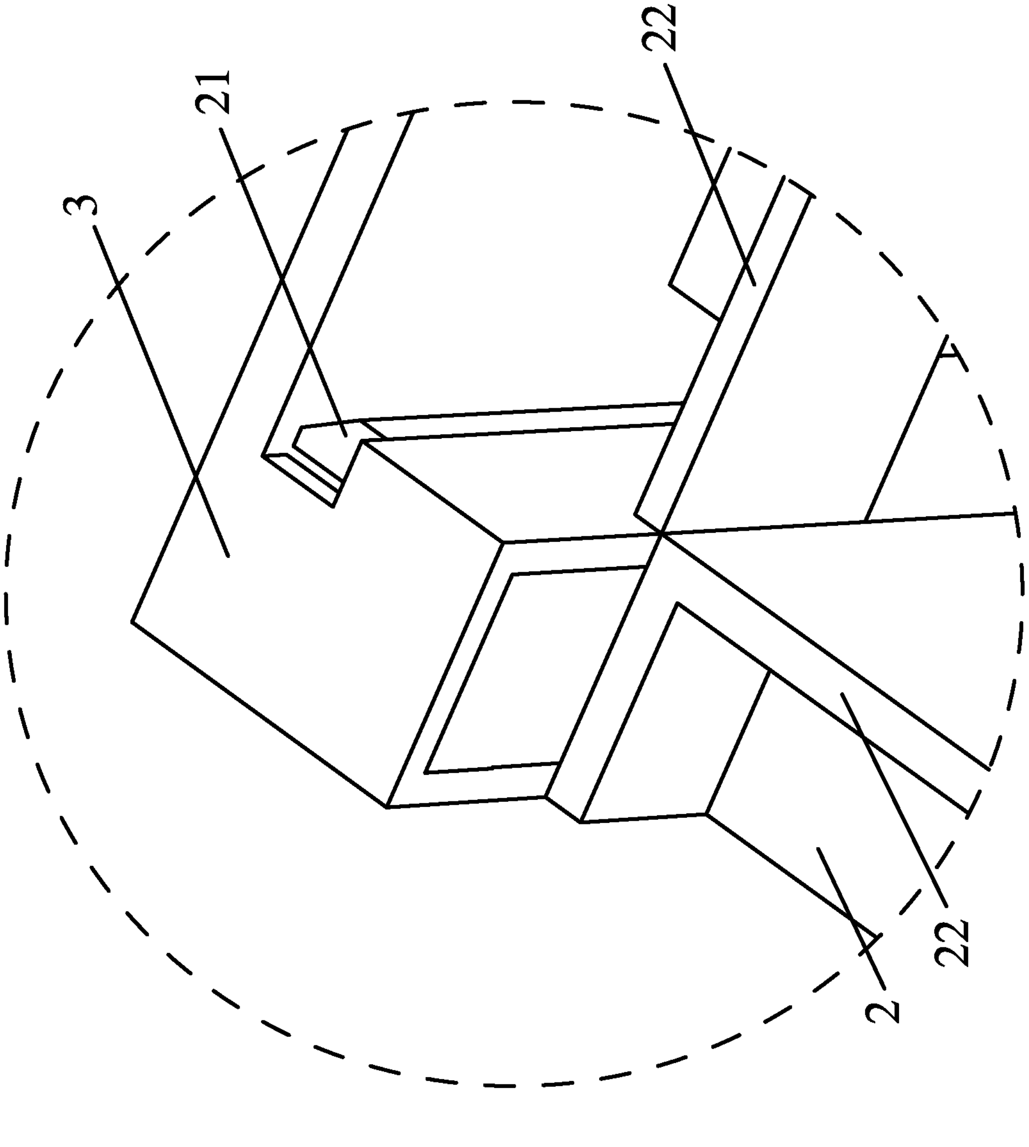
FIG. 11 is a local enlarge view of part D in FIG. 10.

In FIG. 9, each side frame 3 comprises a top portion comprising a plurality of second grooves 30. The two hanging rods 2 comprises a plurality of second inverted structures each comprising two outward extending walls 21. The outward extending wall comprises plastic material and serve as a U-shaped fastener 20. The plurality of second inverted structures is respectively fixedly disposed within the plurality of second grooves through the U-shaped fastener 20, so that the two hanging rods 2 are fixedly disposed on the two side frames.

The two hanging rods, the two side frames and the box body interlock with each other, forming a box structure comprising a top opening. The folder 8 is placed inside the box structure, and the top cover 1 is then disposed on the box structure to close the top opening.

The plurality of wheels 5 is respectively inserted through the plurality of holes 7. Each side frame further comprises a plurality of third inverted structures respectively disposed above the plurality of holes 7. Each of the plurality of wheels 5 further comprises a T-shaped bracket 50. Each wheel 5 is inserted through the corresponding hole 7 and secured in place by the corresponding second inverted structure.

The foldable file box is flat-packed, reducing production and transportation costs, while also preventing transportation damage. Additionally, the foldable file box features preset length and width dimensions to accommodate folders of various sizes in both length and width orientations.

The foldable file box is used to store toys, clothes, and shoes, preferably the folders 8.

It will be obvious to those skilled in the art that changes and modifications may be made, and therefore, the aim in the appended claims is to cover all such changes and modifications.

What is claimed is:

1. A foldable file box, comprising:

a plastic sheet, the plastic sheet comprising a bottom wall and two side walls, and the two side walls being foldable relative to the bottom wall to form a U-shaped structure;

two side frames, interlocking with the bottom wall and the two side walls to form a box structure comprising a top opening;

two hanging rods, each hanging rod comprising a bottom portion interlocking with a top part of the plastic sheet and two ends respectively interlocking with the two side frames; and a top cover, interlocking with the two side frames and the two hanging rods to close the top opening.

2. The foldable file box of claim 1, wherein the two side walls and the bottom wall each comprise a plurality of clasps that are foldable; and the two side frames and the two hanging rods each comprise a plurality of first grooves for respectively interlocking with corresponding clasps.

3. The foldable file box of claim 2, wherein each of the two side frames comprises an inner wall comprising a U-shaped groove; and the two side walls and the bottom wall are embedded into the U-shaped groove.

4. The foldable file box of claim 3, wherein the plurality of clasps are trapezoidal structures disposed on a top portion of each of the two side walls and both ends of the bottom wall; the trapezoidal structures on the two side walls are foldable and interlock with the two hanging rods; and the trapezoidal structures on the bottom wall are foldable and interlock with the two side frames.

5. The foldable file box of claim 4, wherein the trapezoidal structures are bent to an angle of approximately 45° relative to the two side walls or the bottom wall.

6. The foldable file box of claim 2, wherein the plurality of clasps are trapezoidal structures disposed on a top portion of each of the two side walls and both ends of the bottom wall; the trapezoidal structures on the two side walls are foldable and interlock with the two hanging rods; and the trapezoidal structures on the bottom wall are foldable and interlock with the two side frames.

7. The foldable file box of claim 6, wherein the trapezoidal structures are bent to an angle of approximately 45° relative to the two side walls or the bottom wall.

8. The foldable file box of claim 1, wherein both ends of each of the two hanging rods comprise a U-shaped fastener comprising two outward extending walls; and each of the two side frames comprises a second groove matched with the U-shaped fastener.

9. The foldable file box of claim 1, wherein the plastic sheet, the two side frames, the two hanging rods, and the top cover comprise a flexible material.

10. The foldable file box of claim 1, wherein the two hanging rods and the two side frames each comprise a protruding edge through which a folder is hooked on the box structure.

11. The foldable file box of claim 1, wherein each of the two side frames comprises a bottom part and a plurality of wheels pivotally connected to the bottom part.

12. The foldable file box of claim 11, wherein each of the two side frames comprises a plurality of holes; each of the plurality of wheels comprises a bracket that is rotatable; one end of the bracket is disposed into a corresponding hole of each of the two side frames, and the plurality of wheels are detachably connected to the two side frames.

* * * * *